261-44.7 SR LIQUID CONTACT APPARATUS.
F6865 XR RE 14,332

H. M. REICHENBACH.

CARBURETER.

APPLICATION FILED FEB. 8, 1915.

Reissued July 24, 1917.

Re14,332.

SHEETS—SHEET 1.

Witnesses
Edwin J. Bellew.
R. J. Mawhinney.

Inventor
Henry M. Reichenbach,
by Wilkinson Guise & Mackay
Attorneys

261. GAS & LIQUID CONTACT APPARATUS.
3
H. M. REICHENBACH.
CARBURETER.
APPLICATION FILED FEB. 8, 1915.
Reissued July 24, 1917.
14,332.
4 SHEETS—SHEET 2.
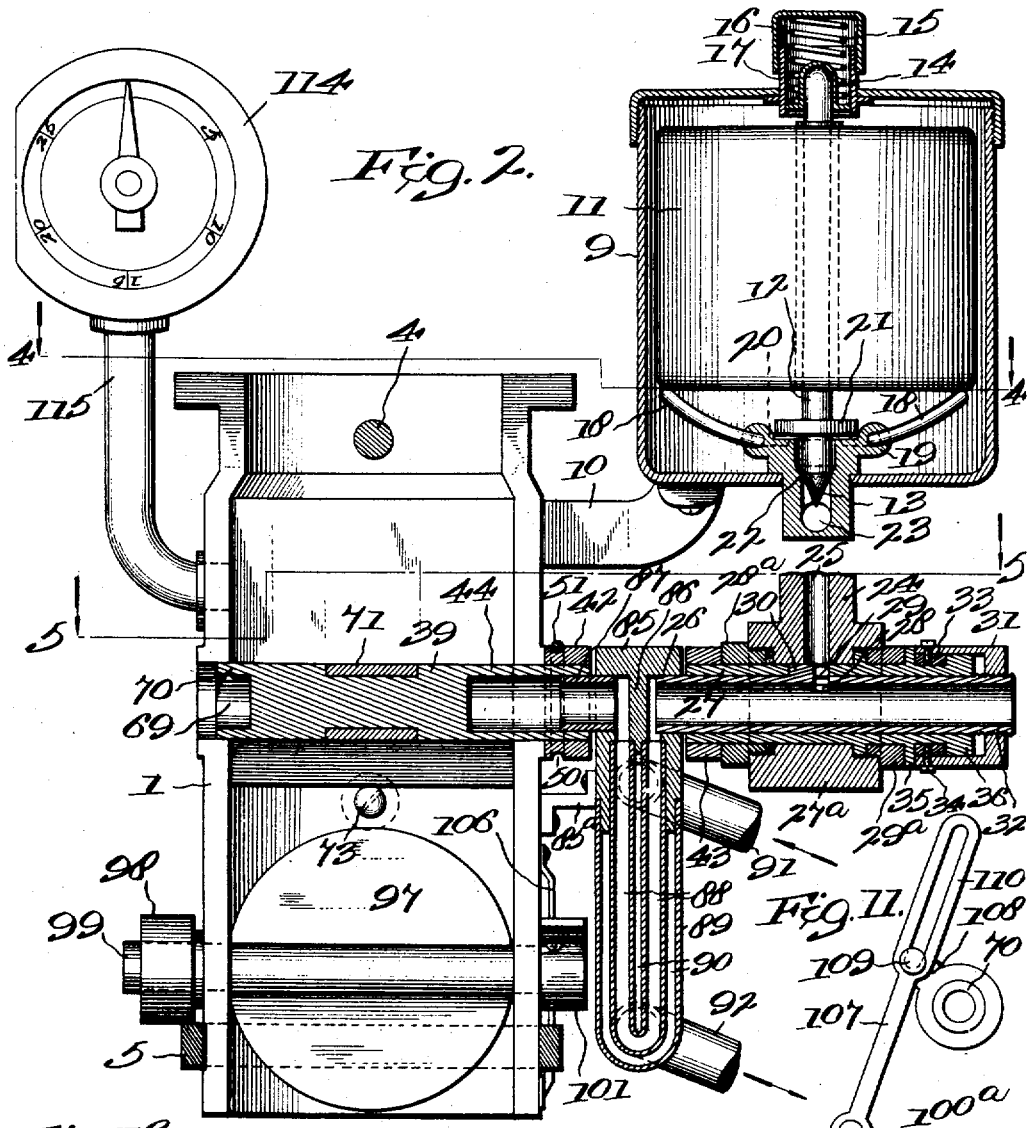
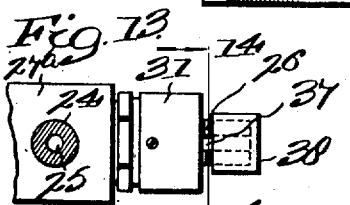
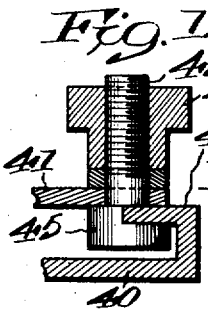
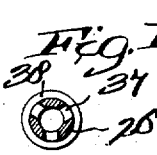
Witnesses
Edwin J. Beller.
R. J. Mawhinney,
Inventor
Henry M. Reichenbach,
by Wilkinson, Guste & Mackay
Attorneys CROSS REFERENCE NO.
261 GAS & LIQUID CONTACT APPARATUS.
3
H. M. REICHENBACH.
CARBURETER.
APPLICATION FILED FEB. 8, 1915.
Reissued July 24, 1917.
14,332.
4 SHEETS—SHEET 3.
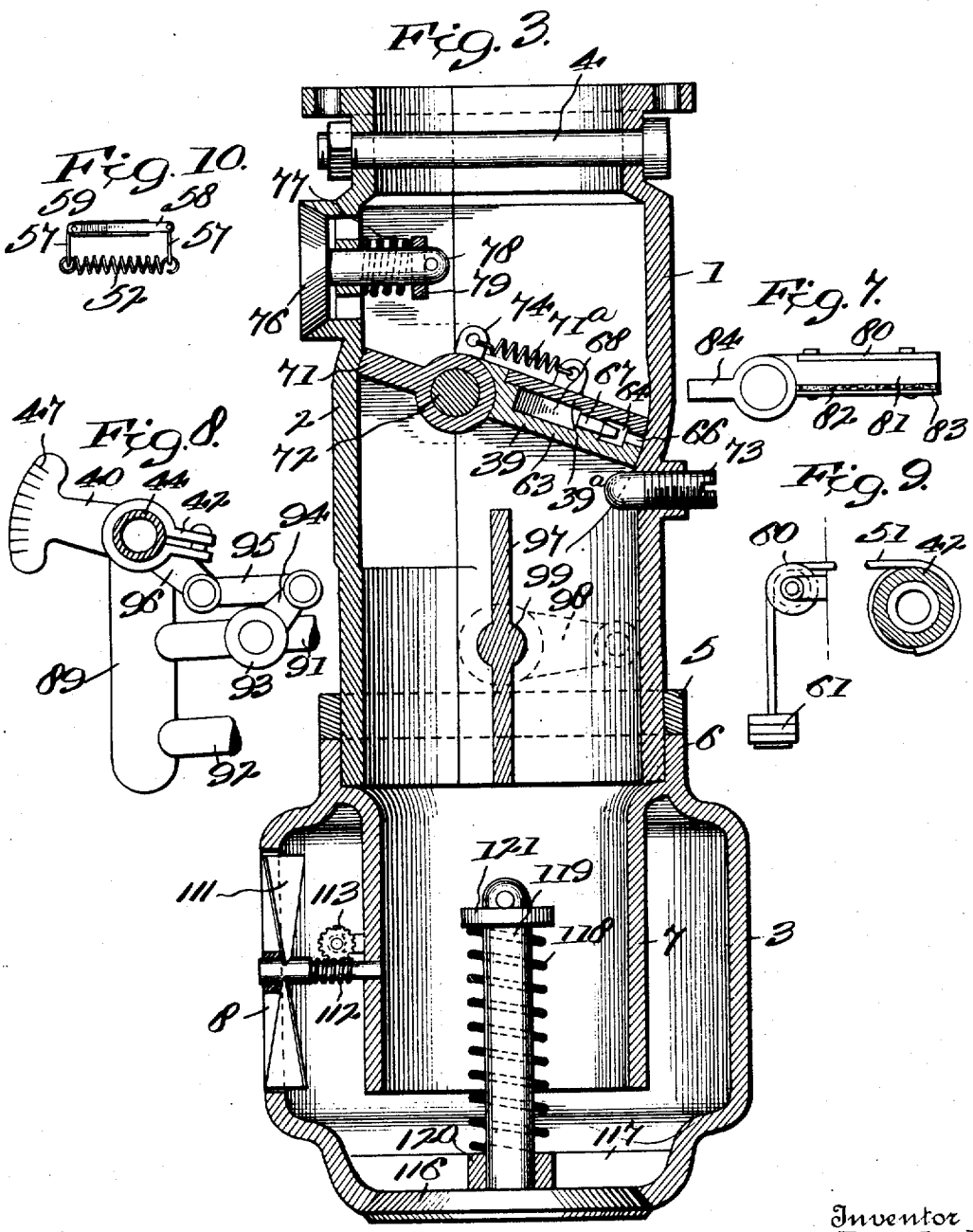
Witnesses
Edwin J. Beller.
P. J. Mawhinney.
Inventor
Henry M. Reichenbach,
By Wilkinson, Gunter & Mackaye.
Attorneys

74

3

H. M. REICHENBACH.

CARBURETER.

APPLICATION FILED FEB. 8, 1915.

Reissued July 24, 1917.

14,332.

4 SHEETS—SHEET 4.

Witnesses

Edwin J. Beller.

R. J. Mackinney.

Inventor

Henry M. Reichenbach,

By Wilkinson, Guste & MacKaye.

Attorneys

UNITED STATES PATENT OFFICE.

HENRY M. REICHENBACH, OF ROCHESTER, NEW YORK.

CARBURETER.

14,332. Specification of Reissued Letters Patent. Reissued July 24, 1917.

Original application filed June 28, 1911, Serial No. 635,860. Renewed March 28, 1913, Serial No. 757,483. Original No. 1,118,805, dated November 24, 1914. Application for reissue filed February 8, 1915. Serial No. 6,934.

*To all whom it may concern:*

Be it known that I, HENRY M. REICHENBACH, a citizen of the United States, residing at Rochester, in the county of Monroe and State of New York, have invented certain new and useful Improvements in Carbureters; and I do hereby declare the following to be a full, clear, and exact description of the invention, such as will enable others skilled in the art to which it appertains to make and use the same.

The present invention relates to carbureters for internal combustion engines and proposes a construction of carbureter wherein the suction of the motor is utilized to effect a more intimate and finely divided admixture of fuel and air than is now obtained, thereby enabling the use of fuels having higher boiling points than those usually employed. The invention has for its further object to produce a carbureter having means adapting the same to be used in connection with a dynamometer or similar instrument for determining its different working conditions to the end that the carbureter may, from the observations made at different speeds, be calibrated so as to make it possible to automatically bring about the best working condition of the carbureter in the future operation of the engine.

With these and other objects in view the invention consists in the arrangement and combination of parts hereinafter claimed, and while the invention is not restricted to the exact details shown and described, still for the purpose of disclosure reference is had to the accompanying drawings, in which like reference characters designate the same parts in the several views, and in which:

Fig. 2 is a central vertical sectional view thereof with parts in elevation.

Fig. 3 is a central sectional view taken at right angles to Fig. 2.

Fig. 7 is a side elevation of a modified construction of the eduction valve.

Fig. 8 is a side elevation of a proposed construction of controlling device associated with the fuel eduction valve.

Fig. 9 is a side elevation, partly in section, of a proposed tensioning device for the fuel eduction valve.

Fig. 10 is a side elevation of a further modified construction of the fuel eduction valve tensioning device.

Fig. 11 is a side elevation of a proposed construction of link connection between the fuel eduction and throttling valves.

Fig. 12 is a detail sectional view of the means for connecting the eduction and fuel feeding valves.

Fig. 13 is a detail view in elevation of a modified structure of fuel feed controlling device; and Fig. 14 is a sectional view of the same taken on the line 14—14 of Fig. 13.

Figure 1:
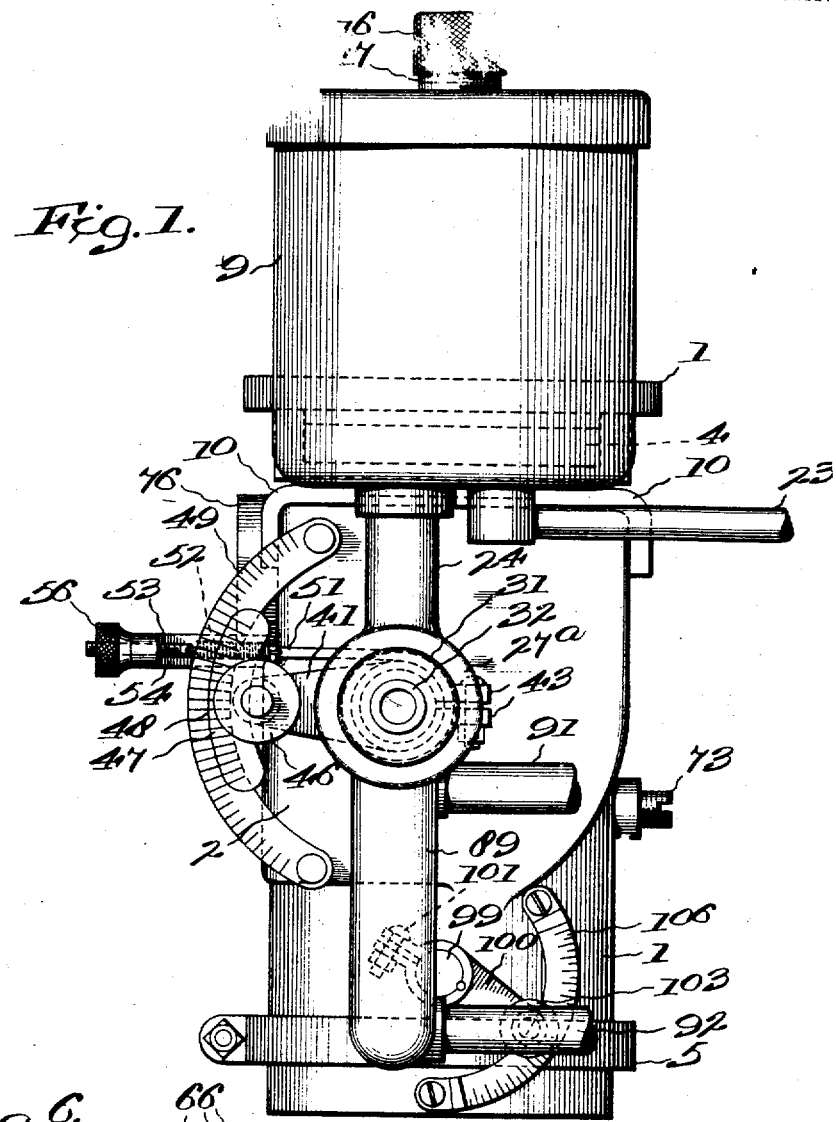
Figure 1 is a front elevation of the complete apparatus.

Referring to the construction in detail the apparatus consists in a casing comprising two semi-cylindrical sections 1 and 2 and a shell 3, Fig. 3. The sections 1 and 2 are secured together at one end by a bolt 4 and at the other end by a band or ring 5, and at which end said sections fit within a collar 6 formed integral with the shell 3. The shell 3 is constructed with an inner annular wall 7 of substantially the same diameter as that of the sections 1 and 2, and with which it communicates and forms a continuous channel for the air taken through the opening 8.

The means for feeding fuel to commingle with the air consists in a tank 9 secured to the casing by brackets 10, Fig. 2. A float 11 is mounted within said casing to have movement on the stem 12 of a needle valve 13, and which valve it is designed to automatically actuate. The valve is normally held seated through the medium of a cap 14 which fits over the upper end of the stem 12 and is held seated thereon through the medium of a spring 15, whose tension may be regulated by a cap 16 that is screw-threaded on the cylinder 17 within which said spring is seated. A pair of levers 18, which are journaled within bearing pieces 19, have the shorter end pieces 20 thereof engaging against the underside of a collar 21, that is fixed on the valve stem 12 and under normal conditions, *i. e.* when the tank 9 is filled with fluid said levers 18 engage only lightly against the collar 21 and allow the valve 13 to be held in its seat 22 through the tension of the spring 15 and thereby effectively close communication with the fuel supply pipe 23. If, on the other hand, the level of liquid within the tank 9 drops below normal the weight of the float 11 on the levers 18 causes the levers' ends 20 to lift the collar 21 and thus open the valve against the tension of said spring 15, and thereby allow the fluid to enter through the pipe 23 until the required level is obtained in the tank 9 when the parts again assume their normal position, as shown in Fig. 2.

Figure 5:
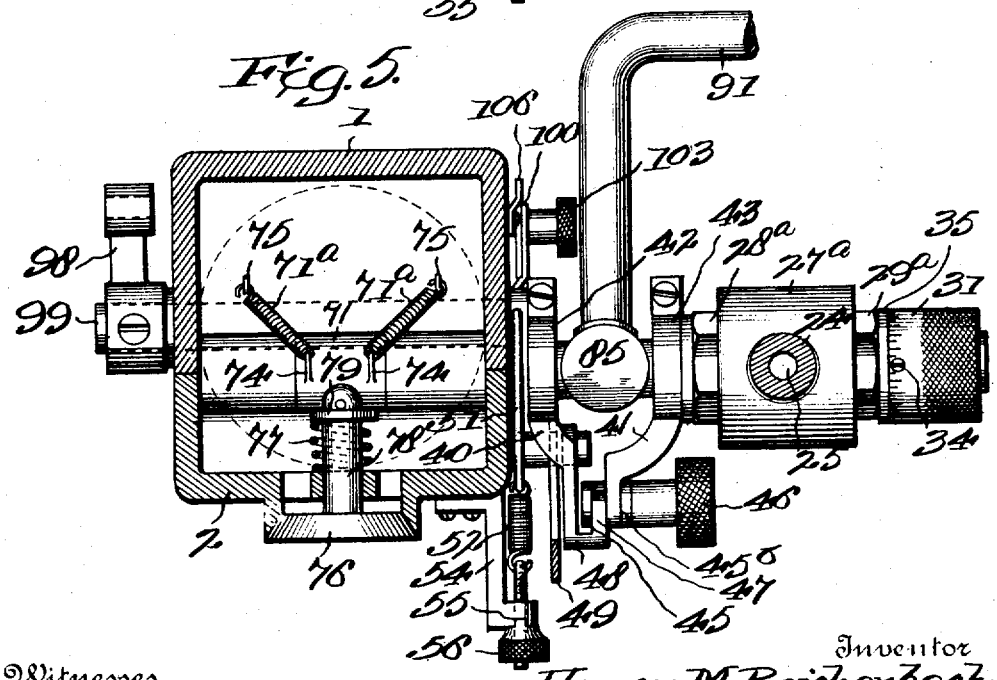
Fig. 5 is a similar view taken on the line 5—5 of Fig. 2.

The fuel is fed from the tank 9 preferably through a super-heater or vaporizer and fuel eduction valve the apparatus for which consists in a pipe 24 having a passageway 25 which communicates with a fluid control pipe 26, as shown in Fig. 2. The pipe 26 is axially and slidably movable within a sleeve 27. The sleeve 27 is secured to rotate in the head 27ª by the glands 28ª and 29ª that are screw-threaded in said head. Said pipe 26 has an aperture 28 that registers with an aperture 29 in the sleeve. The apertures 28 and 29 are in register with the passageway 25 of the pipe 24, and to regulate the amount of fuel commensurate with the speed or load on the motor, said pipe 26 is constructed with a lug 30 which fits within the aperture 29 and is designed to be adjusted laterally of said aperture. The means for effecting said adjustment consists in a knurled head 31 that is screw-threaded on the threads 32 on the outer end of said pipe 26, and which is secured to a split ring 33 by screws 34. The ring 33 is mounted to rotate in an annular groove provided by the collars 35 and 36 formed integrally with the sleeve 27. The knurled head is graduated as shown in Fig. 5 which may be read with respect to an indicating point on the collar 35. With this micrometer gage it will be obvious that turning the knurled head 31 will effect endwise movement of the pipe 26 and thereby cause the lug 30 to vary the extent of cross-sectional opening of the passageway 25 communicating with the opening 29 in the sleeve 27. The opening of the pipe 26 communicates for its full diameter with the external atmosphere, the purpose whereof being first to admit air which mingles with the fuel admitted into said pipe from the reservoir, as will be understood from the construction in Fig. 2, and secondly to prevent the suction of the motor acting on the jet, so that the feed of fuel into the tube 32 and the superheater is partially by gravity. It may be stated that this latter is one of the most important features of the present invention. It is proposed to provide a means for regulating the amount of air so admitted, and to this end a modified construction is designed, as shown in Fig. 13. In this instance the pipe 26 is split at the open end as indicated by the character 37, and a cap 38 is screw-threaded and closes the end of said pipe. The knurled head 31 is, in this construction, mounted as in the manner shown in Fig. 2, and any adjustment thereof will vary the extent of the openings 37 proportionately to the extent of the opening 29.

Figure 4:
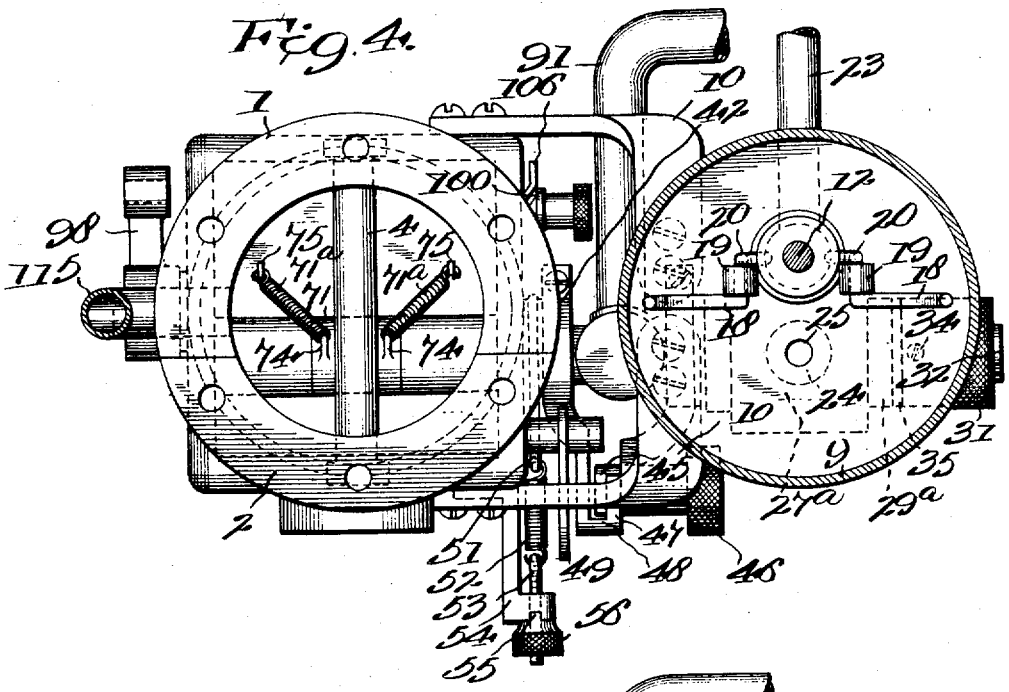
Fig. 4 is a top plan view, partly in section, of the apparatus taken on the line 4—4 of Fig. 2.

As above stated, it is proposed to provide automatically actuated means for varying the amount of fuel fed into the carbureter, and to this end it is designed to have means actuated by the fuel eduction valve 39. Said means consist (see Figs. 1, 4 and 5) of levers 40 and 41 secured by clamps 42 and 43 to the valve shaft 44 and sleeve 27 respectively. The shaft of the valve 39 is mounted to rotate in the casing (1 and 2) and since the extent of such rotation is dependent directly upon the suction of the engine, it will be evident that the connecting levers 40 and 41 will rotate the sleeve 27 a corresponding distance and vary the extent of the opening 29 communicating with the passageway 25.

The means connecting the levers 40 and 41 (see Fig. 12) consists in a bolt 45ª and a milled headed nut 46 screw-threaded thereon. The bolt 45ª is provided at one end with a slotted head 45 adapted to be secured to a graduated sector 47 that is carried by the lever 40, and which indicates the position of the valve on the arcuate scale 49. The sector plate 47 also serves for setting and fixing the levers 40 and 41, and consequently the eduction and fuel supply valves, at different relative positions.

The lever 40 is provided on the portion 42 thereof with an annular groove 50, within which is secured at one end a cord 51 that connects at its other end with a spring 52 (Figs. 1 and 2). The spring 52 is secured to an adjusting screw 53 mounted on a bracket 54 that is secured to the casing section 2. Said bracket has a slot adapted to to receive a projecting piece 55 of a nut 56, which is threaded on the screw 53, the purpose whereof being to secure the adjusted position of said screw.

An arrangement for determining the tension on the spring 52 is shown in Fig. 10. In this construction either end of said spring carries a member 57 that connects respectively with a plunger 58 and cylinder 59 graduated to indicate the amount of pressure exerted upon the fuel eduction valve 39. Instead of the spring 52 a weighted tension device may be employed, and a suitable construction thereof is shown in Fig. 9, wherein the cord 51 passes over a pulley 60 and carries the necessary number of weights 61 at the lower end thereof.

The fuel and air distributing or eduction valve consists (see Fig. 6) of a casting 39 having a cover plate 39ª and constructed with inner and outer walls 62 and 63 respectively providing a channel or mixture passageway 64, which communicates with an opening 65 in the journal 44. The passageway 64 is designed to conduct the fuel to a plurality of apertures 66 formed in the end of the wall 63, and through which apertures the mixture is delivered in finely divided condition into the passageway through the carbureter casing 1 and 2. The wall 62 has secured therein a plurality of jets or nozzles 67 that register with the apertures 66 and are designed to deliver jets of air thereto from the chamber 68, which receives the air through the opening 69 of the valve journal 70.

Figure 6:
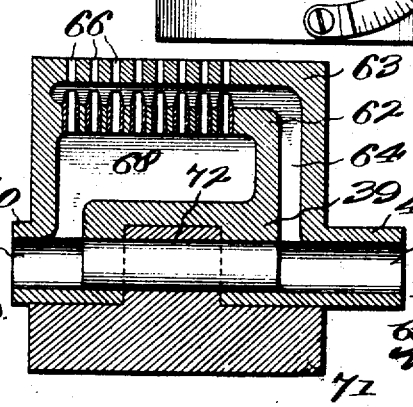
Fig. 6 is a longitudinal sectional view of the fuel eduction valve.

The fuel eduction valve has associated therewith a wing 71 pivotally mounted on a pin 72 that is journaled in the valve coaxially with the bearings 44 and 70 thereof (see Fig. 6). The wing 71 with the fuel eduction valve is designed to effectively close communication through the carbureter casing, and said casing has the walls thereof suitably constructed to permit of actuation of said valve and wing, which movement of the valve is effected directly through the suction of the engine. A stud or bolt 73 is screw-threaded in the casing section 1 and provides a stop or support for the fuel eduction valve when in closed position. Said wing is designed to be moved independently of the fuel valve in the direction counter to the flow of air admitted through the opening 8, the purpose whereof being to guard against the damage of the fuel valve incident to probable back-firing. Two springs 71[a] connect the wing 71 with the fuel valve by the eye pieces 74 and 75 on said wing and valve respectively and normally hold said wing and valve in proper relative position. Under certain conditions, as for instance in the possible event of excessive back firing, it may be desirable to provide an additional safety valve. This contingency is provided for by the valve 76 mounted to open outwardly of the casing. A spring 77 mounted on the valve stem 78 seats against a washer 79 on said stem and keeps the valve 76 normally closed.

An alternative construction of the fuel eduction valve is disclosed in Fig. 7, wherein a removable plate 80 is attached to the valve casing 81, and with a heat insulating layer 82 secured by a plate 83 provides the necessary chamber for the commingled air and fuel and air passageways. In this construction the wing 84 is fixed to the valve as distinct from having movement independently thereof.

A super-heater or vaporizer is located intermediate the fuel eduction and fuel regulating valves and comprises a casing 85 secured by a bracket 85[a] to the section 1, and having a partition 86. Said casing is mounted on the pipe 26 and pipe section 87 to permit of sliding movement of the pipe 26 and rotary movement of the pipe section 87. The passageways through said pipe 26 and pipe section 87 communicate with the chamber in the casing 85 to either side of the partition 86, and a bent pipe or U-shaped tube 88 brings said chambers into communication. A casing 89 incloses the tube lengths 88 and is removably secured to the casing 85 and provides therewith a chamber 90 adapted to receive a heating medium, viz:—exhaust gases, steam, or hot water, from a delivery pipe 91. A similar pipe 92 located adjacent the lower end of the casing 89 provides an outlet for the heating medium. By having the inclosing casing 89 removably secured, said casing may be readily disconnected for the purpose of cleaning.

It is proposed to provide a super-heater with an automatic feed control, and to this end the arrangement shown in Fig. 8 is suited. The construction thereof comprises a valve 93 having an arm 94, which is connected by a link 95 with an arm 96. The arm 96 is in turn secured to the lever 40, which carries the graduated sector piece 47, which sector is in this instance formed integral with the arm 40. By this construction it will be apparent that any movement of the fuel eduction valve will effect a proportionate movement of the valve 93 controlling the admission of the heating medium to the super-heater.

A butterfly throttling valve 97 is journaled within the casing section 1 immediately below the fuel eduction valve and is designed to regulate the flow of air which enters through the opening 8 of the lower section 3. Said throttle valve is designed to be manually actuated, to which end a crank 98 is secured to the valve shaft 99. On its opposite end the shaft 99 carries an arm 100 secured to rotate with said shaft by a clamp 101. The arm 100 carries on its outer end a screw-threaded bolt, that is provided with a milled nut 103, which secures the head of the bolt 102 in engagement with a graduated section 106, that is secured to the casing 1 (see Figs. 1, 4 and 5). The purpose of this arrangement is merely to enable the reading in degrees and secure the position of the valve.

In order that the fuel eduction valve and air regulating valve may be closed through the same manual source, the construction shown in Fig. 11 is proposed. In this arrangement the valve shaft 99 has the lever 100[a] thereof connected by a link 107 to an arm 108 secured to the shaft 70 of the fuel eduction valve. The connection between the link 107 and arm 108 consists in a stud 109, that is designed to slide within the slotted portion 110 of said link. The disposal of the stud 109 and said slot is such that when the arm 107 is moved upwardly it will engage with the stud 109 and move the arm 108, while the downward movement of the arm 107 will allow the stud 109 to remain stationary and thereby not move the arm 108. Also by reason of this slot and stud connection between the arms 100[a] and 108 the air throttling valve 97 may be adjusted independently of the adjustment of the fuel distributing valve.

A fan 111 of an anemometer is mounted within the air inlet 8 and by a suitable gearing 112 and 113 is adapted to connect with and actuate the counter (not shown) for determining the velocity of air admitted through said air passageway.

A vacuum gage 114 for the engine is connected, by a pipe 115, with the casing (1 and 2) at a point above the fuel eduction valve as shown in Fig. 2. A relief valve 116 closes an opening 117 at the bottom of the lower casing 3 and is held in closed position by a spring 118 mounted on the valve stem 119, and which seats against a cross piece 120 formed integral with the casing 3 and with a washer 121 on said stem. Said relief valve is, in addition to the wing 71 and valve 76, also designed to act in the event of possible back-firing of the engine.

It is obvious that those skilled in the art may vary the details of construction and arrangement of parts without departing from the spirit of my invention, and therefore I do not wish to be limited to such features except as may be required by the claims.

I claim:

1. In a carbureter for internal combustion engines, in combination, an intake conduit for said engine, a throttle valve, a swinging suction-actuated valve on the engine side of the throttle valve, a fuel supply device arranged on said suction-actuated valve, and an air supply means also carried on said suction-actuated valve.

2. In a carbureter, the combination of an inlet conduit for an internal combustion engine, a throttle valve in said conduit, a pivoted suction-actuated valve in said conduit between said throttle valve and engine, said suction-actuated valve being provided with means whereby fuel may be supplied through it into said conduit.

3. In a carbureter, the combination of an inlet conduit for an internal combustion engine, a swinging throttle valve in said conduit, a valve casing, a suction-actuated eduction valve in said casing and a conduit between said throttle valve and engine, a fuel atomizer on said eduction valve for supplying fuel to said conduit, means for feeding a fuel to said atomizer, and connections to said eduction valve external to said casing and conduit for controlling the action of said fuel feeding means.

4. In a carbureter, the combination of an inlet conduit for an internal combustion engine, a swinging throttle valve in said conduit, a fuel atomizer opening into said conduit between said throttle valve and engine and provided with air and fuel chambers in communication with the atmosphere, means for feeding a fuel to such fuel chamber, and a device adapted to be actuated by the engine suction for controlling and carrying such fuel feed.

5. In a carbureter, the combination of an inlet conduit for an internal combustion engine, a swinging throttle valve in said conduit, a pivoted suction-actuated valve in said conduit between said throttle valve and engine and carrying an atomizer opening into said conduit from the valve edge, a valve seat in said conduit for closing said atomizer in the closed position of said valve, and means for yieldingly maintaining said valve seated.

6. In a carbureter for internal combustion engines, and an inlet conduit therefor, the combination with a source of fuel supply, a fuel eduction valve, a fuel regulating valve connected to operate with said eduction valve, and an air throttling valve in said conduit, of means connecting said fuel eduction and air throttling valves whereby said valves may be actuated together and independent movement of the eduction valve permitted.

7. In a carbureter for internal combustion engines, and a conduit therefor, the combination with a source of fuel supply, a fuel eduction valve, a fuel regulating means connected to coöperate with said eduction valve, and an air throttling valve in said conduit, of a lever and link connection between said fuel eduction and air throttling valves for actuating said valves together, and a slot in said link allowing of independent movement of the eduction valve.

8. In a carbureter for internal combustion engines, the combination of a casing constituting a motor intake, a throttle valve mounted in said casing at one end thereof, a constant level fuel feeding device, a fuel feeding valve provided with a manually adjustable opening, said opening being in communication with the atmosphere, said casing being provided with a fuel passage from said valve to the interior of the casing between the motor intake and the throttle valve, and means within said casing operated by the suction of the motor to automatically control the fuel feeding valve.

9. In a carbureter, the combination of a source of fuel supply; a fuel eduction valve; an atomizer; a fuel feed regulator between the atomizer and said source of supply; means connecting said eduction valve to automatically actuate the fuel feed regulator; means for manually adjusting said fuel regulator; and means for super-heating and vaporizing the admixture of fuel and air, substantially as described.

10. In a carbureter, the combination of a source of fuel supply; an automatically actuated fuel eduction valve; fuel feed regulating means; means connecting said eduction valve with said regulating means to actuate the latter; means for manually adjusting said fuel feed regulating means; means for mixing the fuel with air, means for regulating said air feed; means for super-heating and vaporizing the admixture of fuel and air; and means for admitting air to the eduction valve to commingle with said admixture, substantially as described.

11. In a carbureter, the combination of a casing; a source of fuel supply; a fuel eduction valve mounted in said casing and adapted to be actuated through the suction of the engine; a fuel feed regulator associated with said eduction valve; means connecting said eduction valve with said fuel feed regulator to actuate the latter; means for manually actuating said fuel feed regulating means; means for mixing the fed fuel with air; means for super-heating and vaporizing the admixture of air and fuel; means associated with said eduction valve for mixing said admixture with air; and means for further mixing the admixture with air as said admixture leave the eduction valve, substantially as described.

12. In a carbureter, the combination with a casing; a source of fuel supply; and a fuel eduction valve; of a fuel regulating valve comprising a perforated tubular body connecting said eduction valve with the source of fuel supply; levers connecting said tube with the eduction valve operable to actuate said tubular body and automatically regulate said fuel supply; and means for manually regulating said fuel supply, substantially as described.

13. In a carbureter, the combination with a casing; a source of fuel supply; and a fuel eduction valve; of a fuel regulating valve comprising a tubular member communicating with said eduction valve and the source of fuel supply; means connecting said tubular member with the eduction valve operable to actuate said tubular member and automatically regulate said fuel supply; a sleeve surrounding said tube; and manually actuated means for moving said sleeve to shift the tubular member axially and regulate said fuel supply, substantially as described.

14. In a carbureter, the combination with a casing; a source of fuel supply; and a fuel eduction valve mounted to oscillate in said casing; of a fuel regulating valve comprising a tubular member communicating with the atmosphere, said eduction valve, and the source of fuel supply and adapted to deliver an admixture of air and fuel to said eduction valve; a lever connecting said eduction valve and tubular member to actuate the latter and automatically regulate the fuel supply; a sleeve inclosing said tubular member and having engagement therewith; and a member on said sleeve adapted to adjust the tubular member laterally to manually regulate the fuel supply, substantially as described.

15. In a carbureter, the combination with a casing and a source of fuel supply; of an eduction valve mounted to oscillate in said casing, and comprising a hollow body provided with apertures; a partitioning wall in said body providing an air chamber; said chamber communicating with the atmosphere; a plurality of apertures in said partitioning wall registering with the apertures in the casing; and means connecting said eduction valve with the source of fuel supply, substantially as described.

16. In a carbureter, the combination with a casing and a source of fuel supply; of a fuel eduction valve having hollow trunnions journaled in said casing; said eduction valve comprising a hollow body having inner and outer walls providing separate and independent chambers; apertures formed in said outer wall; jets secured in the inner wall registering with said apertures; one of said chambers communicating with said apertures and one of the hollow trunnions; means connecting said trunnions with the source of fuel supply; and the other of said chambers bringing said jets into communication with the atmosphere, substantially as described.

17. In a carbureter, the combination with a casing adapted to communicate with the engine cylinder, and a source of fuel supply; of a fuel eduction valve mounted to oscillate in said casing; and independently movable means associated with said valve adapted to give in the event of back firing in the cylinder, substantially as described.

18. In a carbureter, the combination with a casing adapted to communicate with the engine cylinder, and a source of fuel supply; of a fuel eduction valve mounted to oscillate in said casing; and an independently movable wing journaled on said eduction valve adapted to give in the event of back firing in the cylinder, substantially as described.

19. In a carbureter, the combination with a casing adapted to communicate with the engine cylinder, and a source of fuel supply; of a fuel eduction valve mounted to oscillate in said casing; and a valve seated in said casing adjacent the eduction valve adapted to give in the event of back firing in the cylinder, substantially as described.

20. In a carbureter, the combination with a casing adapted to communicate with the engine cylinder, and a source of fuel supply; of a fuel eduction valve mounted to oscillate in said casing; a wing journaled on said eduction valve; and a valve seated in said casing adjacent said wing, said valve and wing adapted to give in the event of back firing in the cylinder, substantially as described.

21. In a carbureter for internal combustion engines, the combination with a source of fuel supply; a fuel eduction valve; a fuel regulating valve connected to operate with said eduction valve; and an air throttling valve; of means connecting said fuel eduction and air throttling valves for actuating said valves together and allowing of independent movement of the eduction valve, substantially as described.

22. In a carbureter for internal combustion engines, the combination with a source of fuel supply; a fuel eduction valve; a fuel regulating valve connected to operate with said eduction valve; and an air throttling valve; of a lever and link connection between said fuel eduction and air throttling valves for actuating said valves together, and a slot in said link allowing of independent movement of the eduction valve, substantially as described.

23. In a carbureter for internal combustion engines, the combination of a casing providing a motor intake; a throttle valve mounted in said casing at one end thereof; a constant level fuel feeding device; a fuel feeding valve provided with a manually adjustable opening, said opening being in communication with the atmosphere; a fuel passage from said valve to the interior of the casing between the motor intake and the throttle valve; and means within said casing operated by the suction of the motor to automatically control the fuel feeding valve, substantially as described.

24. A carbureter comprising an air intake conduit, a pivoted valve through the body of which fluid is supplied and which is suction operated to open and close the air intake conduit, and a valve seat which with the valve when the latter is closed will shut off both the fluid and air.

In testimony whereof, I affix my signature in presence of two witnesses.

HENRY M. REICHENBACH.

Witnesses:

H. A. VAN NORMAN,

F. A. TURNEY.